United States Patent [19]

Radovich

[11] 4,452,924

[45] Jun. 5, 1984

[54] FLEXIBLE POLYURETHANE FOAMS HAVING IMPROVED LOAD BEARING CHARACTERISTICS

[75] Inventor: David A. Radovich, Imperial, Pa.

[73] Assignee: Mobay Chemical Corporation, Pittsburgh, Pa.

[21] Appl. No.: 491,681

[22] Filed: May 5, 1983

[51] Int. Cl.$^3$ ..................... C08G 18/14; C08G 18/32
[52] U.S. Cl. .................................. 521/174; 521/131; 521/133; 521/129; 521/111; 521/128
[58] Field of Search .......................................... 521/174

[56] References Cited

U.S. PATENT DOCUMENTS

| | | | |
|---|---|---|---|
| 3,026,275 | 3/1962 | Mueller et al. | 521/174 |
| 3,054,778 | 9/1962 | Honea et al. | 260/77.5 |
| 3,078,239 | 2/1963 | Gmitter | 521/110 |
| 3,115,481 | 12/1963 | Pigott et al. | 260/77.5 |
| 3,824,199 | 7/1974 | Nadean et al. | 260/2.5 AZ |
| 3,963,681 | 6/1976 | Kaneko et al. | 260/77.5 AM |
| 4,042,537 | 8/1977 | Dahm et al. | 260/2.5 AP |
| 4,045,474 | 8/1977 | Taller et al. | 260/484 A |
| 4,089,835 | 5/1978 | Konig et al. | 260/31.6 |
| 4,309,532 | 1/1982 | Cuscurida et al. | 536/4 |
| 4,316,991 | 2/1982 | Speranza et al. | 568/609 |
| 4,357,430 | 11/1982 | Van Cleve | 521/137 |
| 4,373,034 | 2/1983 | Speranza et al. | 521/177 |
| 4,374,934 | 2/1983 | Raynor | 521/174 |

*Primary Examiner*—H. S. Cockeram
*Attorney, Agent, or Firm*—Gene Harsh; Joseph C. Gil

[57] ABSTRACT

The present invention is directed to the discovery that the substitution of isocyanate coupled polyols for polyols conventionally used in the art leads to flexible polyurethane foams having significantly enhanced load bearing properties. More particularly, the present invention is directed to a process for the production of a flexible polyurethane foam having improved load bearing characteristics and to the foams so produced. The present process broadly comprises reacting an organic polyisocyanate with a coupled polyol in the presence of a blowing agent, a catalyst and a foam stabilizer. The coupled polyol consists essentially of the reaction product of an organic polyisocyanate and an organic compound having a hydroxy functionality ("functionality" as used herein is intended to mean the average number of reaction groups per molecule) of greater than 2, wherein the ratio of hydroxyl groups to isocyanate groups is greater than 1.0.

7 Claims, No Drawings

FLEXIBLE POLYURETHANE FOAMS HAVING IMPROVED LOAD BEARING CHARACTERISTICS

BACKGROUND OF THE INVENTION

Flexible polyurethane foams are generally prepared by reacting an organic polyisocyanate and a polyol in the presence of a blowing agent, a catalyst, and a foam stabilizer. Typical polyols used in the art include polyether polyols prepared by alkoxylating an hydroxy-functional initiator. While foams prepared from these polyols are satisfactory for many applications, such foams are often not firm enough for low density foam applications. Firmer foams can be produced by using polymer polyols prepared by polymerizing one or more ethylenically unsaturated monomers in a polyether polyol; dispersions of polyureas and/or polyhydrazodicarbonamides in hydroxyl group containing materials (see, e.g. U.S. Pat. Nos. 4,042,537 and 4,089,835); higher functionality initiators, short chain crosslinkers and/or fillers. However, these solutions lead to other deficiencies such as processing difficulties, closed cells, or poor tear and elongation properties in low density foams.

Isocyanate coupled polyols are known and have been described in the art. The uses of such coupled polyols are varied and include raw materials for use in producing polyurethane elastomers (see, e.g. U.S. Pat. Nos. 3,115,481 and 3,963,681); warp-sizing agents, floculating agents, films and fibers (see, e.g. U.S. Pat. No. 3,054,778); isocyanate terminated prepolymers for use in making foams (see, e.g. U.S. Pat. No. 3,078,239); and, as a portion of the polyol used to produce polymer polyols (see, e.g. U.S. Pat. No. 4,357,430).

Polyols which have been modified with epoxy resins (see, e.g. U.S. Pat. Nos. 4,309,532, 4,316,991 and 4,373,034) and with diepoxides are also known (see, e.g. U.S. Pat. No. 4,045,474).

Despite all these efforts, the use of an isocyanate-coupled polyol to increase the load-bearing properties of a flexible foam has not been suggested.

DESCRIPTION OF THE INVENTION

The present invention is directed to the discovery that the substitution of isocyanate coupled polyols for polyols conventionally used in the art leads to flexible polyurethane foams having significantly enhanced load bearing properties. More particularly, the present invention is directed to a process for the production of a flexible polyurethane foam having improved load bearing characteristics and to the foams so produced. The present process broadly comprises reacting an organic polyisocyanate with a coupled polyol in the presence of a blowing agent, a catalyst and a foam stabilizer. The coupled polyol consists essentially of the reaction product of an organic polyisocyanate and an organic compound having a hydroxy functionality ("functionality" as used herein is intended to mean the average number of reactive groups per molecule) of greater than 2, wherein the ratio of hydroxyl groups to isocyanate groups is greater than 1.0.

In producing the coupled polyol herein, substantially any organic compound containing more than two hydroxyl groups can be used. Such compounds generally have molecular weights of from about 500 to about 12,000, preferably from about 1000 to about 8,000, and most preferably from about 1,500 to about 7,000. The functionality of the hydroxyl group containing compound is in excess of 2 and preferably has an average functionality of from 2.5 to 8, and most preferably from 2.5 to no more than 4. Preferred compounds include polyesters, polyethers, polythioethers, polyacetals, polycarbonates and polyester amides containing an average of more than 2, and preferably from 2.5 to 4 hydroxyl groups.

Polyesters containing hydroxyl groups suitable for the present invention are reaction products of polyhydric alcohols with polybasic carboxylic acids. Instead of using the free polycarboxylic acids, it is also possible to use the corresponding polycarboxylic acid anhydrides or corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example by halogen atoms) and/or may be unsaturated.

Examples of suitable carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids, such as oleic acid) terephthalic acid dimethylester and terephthalic acid-bis-glycol ester. Suitable polyhydric alcohols include: ethylene glycol 1,2- and 1,3-propylene glycol, 1,4- and 2,3-butylene gycol, 1,6-hexane diol, 1,8-octane diol, neopentyl glycol, 1,4-bis-hydroxymethyl-cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones (for example ε-caprolactone) or of hydroxy carboxylic acids (for example, ω-hydroxy caproic acid) may also be used.

The polyethers suitable for use in accordance with the present invention are known to those in the art. These polyethers may be obtained by polymerizing epoxides, such as ethylene oxide, propylene oxide, butylene oxide, tetrahydrofuran, styrene oxide, or epichlorohydrin in the presence of Lewis catalysts, such as $BF_3$. Polymerization may also be accomplished by the addition of epoxides (preferably ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described in German Auslegeschriften Nos. 1,176,358 and 1,064,938 and formitol or formose-started polyethers (German Offenlegungsschriften Nos. 2,639,083 and 2,737,951) may also be used in accordance with the present invention. In many cases, it is preferred to use polyethers which contain predominantly primary OH-groups (up to 90% by weight, based on all the OH-groups present in the polyether). Polybutadienes containing OH-groups are also suitable to the present invention.

Among the polythioethers which may be employed as the high molecular weight isocyanate reactive compounds, the condensation products of thiodiglycol on its own and/or with other glycols, dicarboxylic acids, formaldehyde, aminocarboxylic acids or amino alcohols are preferred. These condensation products include polythio mixed ethers, polythioether esters or polythioether ester amides.

Polyacetals which may be used in the present invention include the compounds obtained by reacting glycols (such as diethylene glycol, triethylene glycol, 4,4'-dioxethoxy diphenyl dimethyl methane and hexane diol) with formaldehyde. Other polyacetals suitable to the present invention may be obtained by polymerizing cyclic acetals, such as trioxane (German Offenlegungsschrift No. 1,694,128).

Suitable polycarbonates containing hydroxyl groups are known to those in the art. Such polycarbonates may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or with phosgene (German Auslegeschriften Nos. 1,694,080; 1,915,908 and 2,221,751; German Offenlegungsschrift No. 2,605,024).

The polyester amides and polyamides suitable to the present invention include the predominantly linear condensates obtained from polybasic carboxylic acids or anhydrides thereof and polyhydric amino alcohols, diamines, higher polyamines and mixtures thereof.

Polyhydroxyl compounds containing urethane or urea groups, optionally modified natural polyols (such as castor oil), and carbohydrates (for example starch), may also be used as the isocyanate reactive compound of the present invention. Addition products of alkylene oxides with phenol/formaldehyde resins or with urea/formaldehyde resins may also be used.

The above-mentioned polyhydroxyl compounds may be modified in various ways. One such modification (described in German Offenlegungsschriften Nos. 2,210,839 (U.S. Pat. No. 3,849,515) and 2,544,195) is accomplished by etherification of a mixture of different polyhydroxyl compounds (for example, a polyether polyol and a polyester polyol) in the presence of a strong acid to form a relatively high molecular weight polyol which is made up of different segments attached through ether and ester bridges. Amide groups may be introduced into the polyhydroxyl compounds by the procedure disclosed in German Offenlegungsschrift No. 2,559,372. Triazine groups may be introduced in the polyhydroxyl compounds by reacting the polyhydroxyl compounds with polyfunctional cyanic acid esters (German Offenlegungsschrift No. 2,620,487). The reaction of a polyol with a less than equivalent quantity of a diisocyanato-carbodiimide, followed by reaction of the carbodiimide group with an amine, amide, phosphite or carboxylic acid, gives polyhydroxyl compounds containing guanidine, phosphonoformamide or acyl urea groups (German Offenlegungsschriften Nos. 2,714,289; 2,714,292 and 2,714,293).

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and aminofunctional compounds), and polycondensation reactions (for example, between formaldehyde and phenols and/or amines) in situ in the above-mentioned compounds containing hydroxyl groups. Such processes are described in German Auslegeschriften Nos. 1,168,075; 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible to obtain such a polyhydroxyl compound by mixing an aqueous polymer dispersion with a polyhydroxyl compound and subsequently removing the water from the mixture (U.S. Pat. No. 3,869,413 or German Offenlegungsschrift No. 2,550,860).

Polyhydroxyl compounds modified by vinyl polymers obtained by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly low combustibility are obtained by using polyether polyols modified by graft polymerization with vinyl phosphonic acid esters and, optionally, (meth-)acrylonitrile, (meth-)acrylamide or OH-functional (meth-)acrylic acid esters (German Offenlegungsschriften Nos. 2,442,101; 2,644,922 and 2,646,141). Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) are particularly advantageous when used in combination with mineral fillers.

Where modified polyhydroxyl compounds of the type mentioned above are used as starting components in the polyisocyanate-polyaddition process, polyurethanes having considerably improved mechanical properties are generally obtained.

Representatives of the above-mentioned isocyanate-reactive compounds suitable to the present invention are described in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl Hanser-Verlag, Munich, 1966, for example on pages 45 to 71. It is, of course, possible to use mixtures of the above-mentioned compounds.

In producing the coupled polyols of the present invention, substantially any organic polyisocyanate may be used. Aliphatic, cycloaliphatic, araliphatic, aromatic and heterocyclic polyisocyanates may be used. Examples of suitable polyisocyanates are described by W. Siefken in Justus Liebigs Annalen der Chemie, 562 pages 75 to 136. Among the polyisocyanates described therein are those corresponding to the general formula Q(NCO)$_n$ wherein n represents 2–4, preferably 2; and Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 15 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are: triphenyl methane-4,4',4"-triisocyanate, polyphenyl polymethylene polyisocyanates of the type obtained by condensing aniline with formaldehyde followed by phosgenation (described in British Pat. Nos. 874,430 and 848,671); m- and p-isocyanatophenyl sulfonyl isocyanates (U.S. Pat. No. 3,277,138); polyisocyanates containing carbodiimide groups (German Patent No. 1,092,007 (U.S. Pat. No. 3,152,162) and German Offenlegungsschriften Nos. 2,504,400; 2,537,685 and 2,552,350)); norbornane diisocyanates (U.S. Pat. No. 3,492,330); polyisocyanates containing allophanate groups (British Pat. No. 994,890, Belgian Pat. No. 761,626 and Dutch Patent Application No. 7,102,524); polyisocyanates containing isocyanurate groups (U.S. Pat. No. 3,001,973); German Pat. Nos. 1,022,789; 1,222,067 and 1,027,394 and German Offenlegungsschriften Nos. 1,929,034 and 2,004,048); polyisocyanates containing urethane groups (Belgian Pat. No. 752,261, U.S. Pat. No. 3,394,164 and 3,644,457); polyisocyanates containing acylated urea groups (German Pat. No. 1,230,778); polyisocyanates containing biuret groups (U.S. Pat. Nos. 3,124,605 and 3,201,372, British Pat. No. 889,050); polyisocyanates produced by telomerization reactions (U.S. Pat. No. 3,654,106); polyisocyanates containing ester groups (British Pat. Nos. 965,474 and 1,072,956, U.S. Pat. No. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883). It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially available polyisocyanates be used in the present invention. Such readily available materials include 2,4- and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

The coupled polyols can be produced by adding the isocyanate to the polyol with agitation. The choice of reaction conditions is primarily a function of the reaction time desired. The use of elevated temperatures and the addition of catalysts known in the art to promote urethane formation (e.g., dibutyltin dilaurate) are beneficial for decreasing the reaction time. Reaction temperatures of 50° to 100° C. at dibutyl tin dilaurate levels of from 100 to 200 parts per million are generally satisfactory for completion of the reaction in a one to four hour time period. The temperature is generally held at the elevated point until all of the isocyanate has reacted. Coupled polyols that are suitable for the present invention can be produced by using either batch or continuous production methods.

In producing the coupled polyol, the ratio of hydroxyl groups to isocyanate groups must be greater than 1. Since the degree of load bearing improvement imparted to the foam by the coupled polyols of this invention is a function of the extent of coupling, it will generally be desirable to utilize an amount of polyisocyanate in relation to the polyol (described as isocyanate index, which is defined as $$\frac{\text{Equivalents of NCO}}{\text{Equivalents of OH}} \times 100)$$

which yields the desired improvement in load bearing. To avoid the presence of free isocyanate groups, the polyol should be present in an amount sufficient to provide an excess of hydroxyl groups. Thus, the lower limit of the isocyanate index will generally be determined by the degree of load bearing improvement desired, while the upper limit will generally be determined by the viscosity level which can be tolerated.

In general, the isocyanate index will be as low as 10 up to the index at which "gel" occurs. Gelation marks the division of the mixture into two parts: the gel, which is insoluble in all nondegrading solvents, and the sol, which remains soluble and can be extracted from the gel. Preferably the isocyanate index is no higher than that which will yield a coupled polyol of about 100,000 cps.

In preparing the foams of the present invention, the coupled polyol is reacted with an organic polyisocyanate in the presence of a blowing agent, a catalyst and a foam stabilizer. The isocyanates useful include all of those noted above. Although not preferred, the coupled polyol can be blended with any of the polyols noted above in substantially any blending ratio. The amount of uncoupled polyol can thus range from 0 to 95 percent by weight, and preferably from 20 to 80 percent by weight, based on the total weight of coupled polyol and uncoupled polyol.

Suitable blowing agents include water and/or readily volatile inorganic or organic substances. Appropriate organic blowing agents are acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane; and butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g., nitrogen, given off by azo compounds, such as azodicarbonamide or azobutyronitrile). Other examples of blowing agents and information on the use of blowing agents may be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalysts known in the art are also used in the practice of the present invention. Among these catalysts are tertiary amines such as triethylamine, tributylamine; N-methyl morpholine; morpholine; N,N,N'N'-tetramethyl ethylene diamine, pentamethyl diethylene triamine and higher homologues (German Offenlegungsschriften Nos. 2,624,527 and 2,624,528); 1,4-diazabicyclo-(2,2,2)-octane; N-methyl-N'-dimethylamino-methyl piperidine; bis(dimethylaminoalkyl) piperazines (German Offenlegungsschrift No. 2,636,787); N,N-dimethyl benzylamine; N,N-dimethyl cyclohexylamine; N,N-diethyl benzylamine; bis(N,N-diethylaminoethyl)-adipate; N,N,N',N',-tetramethyl-1-3-butane diamine; N,N-dimethyl-$\beta$-phenyl ethylamine; 1,2-dimethylimidizole; 2-methyl imidazole, monocyclic and bicyclic amidines (German Offenlegungsschrift No. 1,720,633); bis-(dialkylamino)-alkyl ethers (U.S. Pat. No. 3,330,782, German Auslegeschrift No. 1,030,558, German Offenlegungsschriften Nos. 1,804,361 and 2,618,280); and tertiary amines containing amide groups (preferably formamide groups) according to German Offenlegungsschriften Nos. 2,523,633 and 2,732,292. Other suitable catalysts are also Mannich bases of secondary amines (such as dimethyl-amine), aldehydes (preferably formaldehyde), ketones (such as acetone, methylethyl ketone and cyclohexanone) and phenols (such as phenol, nonyl phenol or bisphenol).

Tertiary amines containing isocyanate-reactive hydrogen atoms suitable for use as catalysts are triethanolamine, tri-isopropanolamine, N-methyl diethanolamine, N-ethyl diethanol-amine, N,N-dimethylethanolamine, the reaction products thereof with alkylene oxides (such as propylene oxide and/or ethylene oxide), and also secondary-tertiary amines according to German Offenlegungsschrift No. 2,732,292.

Other suitable addition catalysts are sila-amines containing carbon-silicon bonds of the type described in German Pat. No. 1,229,290 (corresponds to U.S. Pat. No. 3,620,984). Examples of these compounds are 2,2,4-trimethyl-2-silamorpholine and 1,3-diethylaminomethyl tetramethyl disiloxane.

Other catalysts which may be used in the present invention include: nitrogen-containing bases (such as tetraalkyl ammonium hydroxides), alkali metal hydroxides, (such as sodium hydroxide), alkali metal phenolates (such as sodium phenolate) and alkali metal alcoholates (such as sodium methylate). Hexahydrotriazines may also be used as catalysts (German Offenlegungsschrift No. 1,769,043).

The reaction between NCO-groups and Zerewitinoff active hydrogen atoms may also be greatly accelerated by use of lactams and azalactams which are believed to form a complex with the compound containing acid hydrogen. Such complexes and their catalytic effect are described in German Offenlegungsschrift Nos. 2,062,288; 2,062,289; 2,117,576 (U.S. Pat. Nos. 3,758,442); 2,129,198, 2,330,175 and 2,330,211.

Organometallic compounds, particularly organo-tin compounds may also be used as catalysts in the present invention. In addition to sulfurcontaining compounds such as di-n-octyl tin mercaptide (German Auslegeschrift No. 1,769,367; U.S. Pat. No. 3,654,927), preferred organo-tin compounds are tin (II) salts of carboxylic acids such as tin (II) acetate, tin (II) octoate, tin (II) ethyl hexoate and tin (II) laurate, and tin (IV) compounds, for example, dibutyl tin oxide, dibutyl tin dichloride, dibutyl tin diacetate, dibutyl tin dilaurate, dibutyl tin maleate and dioctyl tin diacetate.

The above-mentioned catalysts may also be used in the form of mixtures. Combinations of organometallic compounds and amidines, aminopyridines or hydrazino pyridines (German Offenlegungsschriften Nos. 2,434,185; 2,601,082 and 2,603,834) are particularly advantageous.

Additional catalysts which may be used in accordance with the present invention may be found in Kunststoff-Handbuch by Vieweg and Hochtlen, Vol. VII, Carl-Hanser-Verlag, Munich, 1966, for example on pages 96 to 102. The additional catalysts are generally used in a quantity of from about 0.001 to 10% by weight, (based on the total quantity of compounds containing at least two isocyanate-reactive hydrogen atoms).

Suitable foam stabilizers include polyether siloxanes, particularly water-soluble types. The structure of these compounds is generally such that a copolymer of ethylene oxide and propylene oxide is attached to a polymethyl siloxane residue. Such foam stabilizers are described in U.S. Pat. Nos. 2,834,748; 2,917,480 and 3,629,308. In many cases, polysiloxane-polyoxyalkylene copolymers branched through allophanate groups (German Offenlegungsschrift No. 2,558,523) are particularly advantageous.

Reaction retarders (e.g., acid-reacting substances such as hydrochloric acid or organic acid halides) cell regulators (such as paraffins or fatty alcohols or dimethyl polysiloxanes), pigments, dyes, known flameproofing agents (for example trischloroethyl phosphate, tricresyl phosphate or ammonium phosphate and polyphosphate), stabilizers against the effects of ageing and weather, plasticizers, fungistatic and bacteriostatic substances, and fillers (such as barium sulphate, kieselguhr, carbon black or whiting) may also be used in the practice of the present invention.

Additional examples of surface-active additives, foam stabilizers, cell regulators, reaction retarders, stabilizers, flameproofing agents, plasticizers, dyes, fillers, fungistatic and bacteriostatic substances which may optionally be used in the present invention and information on the way in which these additives may be used may be found in Kunststoff-Handbuch, by Vieweg and Hochtlen, Vol. VII, Carl-Hanser-Verlag, Munich, 1966, for example on pages 103 to 113.

The process of the present invention may be carried out by techniques well known to those in the art. These known methods include reacting the starting materials by the one-shot process. Suitable apparatuses are described in U.S. Pat. No. 2,764,565. Particulars of processing machines may also be found in Kunststoff-Handbuch by Vieweg and Hochtlen, Vol. VII, Carl-Hanser-Verlag, Munich, 1966, for example on pages 121 to 205.

Foams may be made in accordance with the present invention by introducing the foamable reaction mixture into a closed mold. Suitable mold materials are metals (for example, aluminum) or plastics (for example epoxide resin). The foamable reaction mixture foams in the mold and forms the molding. In-mold foaming may be carried out in such a way that the molding has either a cellular structure at its surface, or a compact skin and a cellular core. The foamable reaction mixture may be introduced into the mold in such a quantity that the foam formed just fills the mold. However, it is also possible to introduce more foamable reaction mixture than is required to fill the interior of the mold with foam. This latter technique is known as "overcharging" and is described in U.S. Pat. Nos. 3,178,490 and 3,182,104. In many cases known "external release agents", (such as silicone oils) are used for in-mold foaming. However, it is also possible to use so-called "internal release agents", optionally in admixture with external release agents, of the type described in German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086). Foams may also be produced by block foaming.

The products of the present invention may be used as upholstery material, cushioning, carpet underlay and mattresses.

Having thus described our invention, the following examples are given by way of illustration. All percentages and parts given in these examples are by weight unless otherwise indicated.

EXAMPLES

In the examples which follow, the following polyols were used:

(a) POLYOL A: a propylene oxide tipped glycerine/propylene glycol initiated polyether (wt. ratio of glycerine to propylene glycol is about 7:1) containing both propylene oxide and ethylene oxide units in the chain (wt. ratio of propylene oxide to ethylene oxide is about 9:1) and having an average hydroxyl functionality of 2.8, an hydroxyl number of 56 and a number average molecular weight of about 2800.

(b) POLYOL B: is a commercially available, glycerine-initiated propylene oxide tipped polyether polyol known as DOW 3010 having an average functionality of 3, an OH number of 56, a molecular weight of 3000 and having both propylene oxide and ethylene oxide units.

(c) POLYOL C: is a commercially available, glycerine-initiated polyether polyol known as LG-56, having an average functionality of 3, an OH number of 56, a molecular weight of 3,000, and having all propylene oxide units.

(d) POLYOL D: is a glycerine/propylene glycol initiated (weight ratio of glycerine to propylene glycol is about 7:1) propylene oxide tipped polyether polyol having an average functionality of 2.8, an OH number of 85, a number average molecular weight of 1850, and having both propylene oxide and ethylene oxide units (weight ratio of propylene oxide to ethylene oxide is about 9:1).

(e) POLYOL E: is a propylene oxide-tipped glycerine initiated polyether containing both propylene and ethylene oxide units (weight ratio of propylene oxide to ethylene oxide is about 3:1) and having a functionality of 3, a hydroxyl number of 25 and a number average molecular weight of 6700.

(f) POLYOL F: is a dispersion having an OH number of 28 and consisting of a polyhydrazodicarbonamide in a glycerine initiated propylene oxide/ethylene oxide polyether with an OH number of 35. The dispersion has an average functionality of 3 and a number average molecular weight of 6000, and contains about 80% primary OH groups.

(g) POLYOL G: is a commercially available polymer polyol known as PLURACOL 684, having a functionality of 3, an OH number of 36, and a molecular weight of 4700 and is based on the polymerization of styrene and acrylonitrile in a glycerine-initiated propylene oxide-tipped polyether containing propylene oxide and ethylene oxide units and having an OH number of about 50.

(h) POLYOL H: is a propylene oxide tipped glycerine initiated polyether containing both propylene oxide and ethylene oxide units (weight ratio of propylene oxide to ethylene oxide is about 3:1), and having a functionality of 3, an OH number of 56 and a molecular weight of 3000.

(i) POLYOL I: is a glycerine initiated propylene oxide/ethylene oxide polyether (weight ratio of propylene oxide to ethylene oxide is about 6:1) of OH number 35, molecular weight of 4800, functionality of 3, and containing about 75% primary OH groups.

(j) POLYOL J: is a commercially available 2000 molecular weight polyester polyol known as FOAMREZ 50 and is based on diethylene glycol, glycerine and adipic acid.

In the Examples which follow, the following isocyanate coupling agents were used:

(a) COUPLING AGENT I: toluene diisocyanate containing about 80% of the 2,4-isomer and about 20% of the 2,6-isomer.

(b) COUPLING AGENT II: toluene diisocyanate containing about 65% of the 2,4-isomer and about 35% of the 2,6-isomer.

(c) COUPLING AGENT III: hexamethylene diisocyanate.

(d) COUPLING AGENT IV: 4,4'-diphenylmethane diisocyanate.

(e) COUPLING AGENT V: 4,4'-diphenylmethane diisocyanate which has been reacted with tripropylene glycol in a molar ratio of about 5:1 and has an NCO content of about 23%.

(f) COUPLING AGENT VI: a commercially available isocyanate known as MONDUR HR which is an allophanate modified toluene diisocyanate having an NCO content of about 40%.

(g) COUPLING AGENT VII: a commercially available isocyanate known as MONDUR MR which is a polymethylene polyphenyl polyisocyanate having an NCO content of 31.5 and an amine equivalent of 133.

In the Examples which follow, the following additional materials were used:

(1) ISOCYANATE I: toluene diisocyanate containing about 80% of the 2,4-isomer and about 20% of the 2,6-isomer.

(2) ISOCYANATE II: toluene diisocyanate containing about 65% of the 2,4-isomer and about 35% of the 2,6-isomer.

(3) POLYCAT 70: a commercially available tertiary amine available from Abbott Laboratories, Inc.

(4) C-7: a mixture of 25 percent by weight stannous octoate and 75 percent by weight dioctyl phthalate.

(5) L-6202: a modified polydimethylsiloxane available from Union Carbide.

(6) E-9400: a tertiary amine available from Mobay Chemical Corporation.

(7) L-520: a commercially available siloxane from Union Carbide.

(8) C-2: stannous octoate (9) L-532: a modified polydimethylsiloxane available from Union Carbide.

The various polyols and isocyanate coupling agents were combined at the NCO/OH index noted in the following TABLE I.

The following procedure was used to produce all of the coupled polyols in all of the examples: The polyol was charged to a reactor equipped with a motor driven agitator and having heating and cooling capabilities. Dibutyltindilaurate catalyst (in an amount of about 100 ppm based on the total weight of polyol and isocyanate) was added to the polyol and the contents of the reactor were heated to a temperature of 80°-85° C. The coupling agent was then charged to the reactor while maintaining a reaction temperature of 80°-85° C. A nitrogen atmosphere was maintained in the vessel during the reaction. After a 2 hour reaction time, no unreacted isocyanate groups were detectable by infrared spectroscopic analysis. The product was then cooled and removed from the reactor.

Polyurethane foams were then produced using one of the following procedures:

PROCEDURE 1

Box pour foams (13"×13", free rise) were prepared for each coupled polyol investigated. The polyol components, (polyol, water, amine catalyst, tin catalyst and silicone surfactant) were pre-mixed for 15 seconds at 1500 RPM. The addition of the isocyanate was followed by a 5 second mix at 2000 RPM. The mixture was poured into a cardboard box. After allowing the foams to cure for 24 hrs., a 11"×11"×3" pad was cut from the center of the bun and used for physical testing.

PROCEDURE 2

Production-scale runs were made on a Hennecke UBT-65 machine under the following conditions:

| Mixer type | Pin |
| --- | --- |
| Mixer speed, RPM | 3500 |
| Throughput, lb/min | 110-120 |
| Polyol/TDI Temperature, °F. | 75/75 |

A 40"×100"×18" high bun was produced and allowed to cure for 24 hor. prior to cutting. A cross-section 15" wide was cut from the center of the bun and used for physical property testing.

In Examples 1 through 22, polyurethane foams were produced using the following foam formulations:

| COMPONENT | Parts by weight |
| --- | --- |
| Polyol | 100 |
| Isocyanate I | Variable (See Table I) |
| Water | 4.0 |
| Polycat 70 | 0.15 |
| C-7 | Variable (See Table I) |
| L-6202 | 1.3 |

In each instance the isocyanate index of the foam formulation was 116. The procedure used to make a particular foam was as noted in Table 1.

The resultant foams were all open celled and non-shrinking and exhibited other properties characteristic of flexible polyurethane foams. All of the foams had densities of between 1.4 and 1.8 pounds per cubic foot (see Table 1). While the densities did vary somewhat, it is known that the change in foam loadbearing attributable solely to density over the small density range is minimal.

All of the foams were tested for foam load bearing using ASTM D-3574-81 and the 25% Rest Indentations Force Deflection (25%R IFD) was recorded. The results were set forth in Table I. Examples 1, 11, 13, 15, 17, 19 and 21 represent comparison examples.

TABLE I

| Example Number | Polyol | Isocyanate Coupling Agent | Coupled Polyol NCO/OH Index | Amount of Isocyanate I Used To Make Foam, pbw | Amount C7, pbw | Density pounds per cubic foot | 25% R IFD #/50 in$^2$ | Procedure |
| --- | --- | --- | --- | --- | --- | --- | --- | --- |
| 1 | A | None | — | 55.30 | 0.72 | 1.5 | 38 | 2 |
| 2 | A | I | 20 | 53.41 | 0.72 | 1.5 | 53 | 2 |
| 3 | A | I | 35 | 52.14 | 0.64 | 1.5 | 57 | 2 |
| 4 | A | I | 45 | 51.27 | 0.56 | 1.5 | 64 | 2 |
| 5 | A | II | 45 | 50.50 | 0.64 | 1.8 | 54 | 1 |
| 6 | A | III | 45 | 50.51 | 0.70 | 1.7 | 53 | 1 |
| 7 | A | IV | 45 | 50.41 | 0.70 | 1.7 | 52 | 1 |
| 8 | A | V | 45 | 50.41 | 0.45 | 1.6 | 61 | 1 |
| 9 | A | VI | 45 | 50.49 | 0.56 | 1.7 | 66 | 1 |
| 10 | A | VII | 35 | 51.53 | 0.20 | 1.6 | 49 | 1 |
| 11 | B | None | — | 55.30 | 0.65 | 1.5 | 37 | 1 |
| 12 | B | I | 45 | 50.46 | 0.64 | 1.7 | 52 | 1 |
| 13 | C | None | — | 55.43 | 0.72 | 1.4 | 30 | 1 |
| 14 | C | I | 45 | 50.46 | 2.00 | 1.7 | 45 | 1 |
| 15 | D | None | — | 60.59 | 0.10 | 1.8 | 36 | 1 |
| 16 | D | I | 35 | 54.75 | 0.05 | 1.7 | 45 | 1 |
| 17 | E | None | — | 49.98 | 0.64 | 1.8 | 46 | 1 |
| 18 | E | I | 35 | 48.22 | 1.20 | 1.8 | 52 | 1 |
| 19 | F | None | — | 50.15 | 2.00 | 1.7 | 50 | 1 |
| 20 | F | I | 35 | 48.34 | 2.00 | 1.8 | 84 | 1 |
| 21 | G | None | — | 51.71 | 1.20 | 1.6 | 73 | 1 |
| 22 | G | I | 35 | 49.25 | 1.05 | 1.6 | 100 | 1 |

EXAMPLE 23

The same foam formulation was used as in Example 1 using Procedure 1. However, in the first case, the polyol used was POLYOL E, and in the second, a coupled polyol produced from POLYOL H and isocyanate Coupling Agent I (NCO/OH index of 36) was used. The resultant coupled polyol had substantially the same number average molecular weight (i.e. about 6700) as POLYOL E. The foam produced from POLYOL E had a 25%R IFD of 46 while that produced from the coupled polyol had a 25%R IFD of 55.

EXAMPLE 24

Two foams were produced using Procedure 1, from the formulations which follow, with the results obtained as noted.

|  | A, pbw | B, pbw |
| --- | --- | --- |
| Polyol I | 100 | — |
| Coupled Polyol (from Polyol I and Coupling Agent I at an NCO/OH index = 35) | — | 100 |
| Isocyanate I | 27 | 25.85 |
| Isocyanate II | 27 | 25.85 |
| (Foam Index) | (105) | (105) |
| Water | 4.7 | 4.7 |
| Catalyst E-9400 | 0.3 | 0.12 |
| N—ethylmorpholine | 0.4 | 0.30 |
| L-520 | 1.0 | 1.0 |
| C-2 | 1.0 | 0.3 |
| Foam Density, pcf | 1.44 | 1.77 |
| 25% R IFD #/50 in.$^2$ | 44 | 59 |

EXAMPLE 25

Two foams were produced using Procedure 1 from the formulations which follow, with the results obtained as noted.

|  | A, pbw | B, pbw |
| --- | --- | --- |
| Polyol J | 100 | — |
| Coupled Polyol (Polyol J + Agent I at an (NCO/OH index 35) | — | 100 |
| Isocyanate I | 47.3 | 44.25 |
| (Foam Index) | (105) | (105) |
| Water | 3.8 | 3.8 |
| L-532 | 1.5 | 1.5 |
| N—ethylmorpholine | 1.5 | 1.5 |
| C-2 | 0.1 | — |
| Foam Density, pcf | 1.41 | 1.55 |
| 25% R IFD, #/50 in.$^2$ | 47 | 56 |

EXAMPLES 26-28

Formulations identical to those of Example 1 were used and were processed by Procedure 2. In these examples, however, in producing the foam, a blend of coupled polyol with unmodified polyol was used and the results and amounts of materials are as indicated in Table 2.

TABLE II

| Example | Polyol | Coupling Agents | Coupled Polyol NCO/OH Index | Polyol Used For Blending | Blend Ratio Wt. % Coupled Wt % uncoupled | 25% R IFD |
| --- | --- | --- | --- | --- | --- | --- |
| Comparison | A | None | — | — | — | 38 |
| 26 | A | I | 35 | A | 58/42 | 49 |
| 27 | A | I | 45 | A | 45/55 | 51 |
| 28 | A | I | 45 | A | 78/22 | 61 |

What is claimed is:

1. A method of increasing the load bearing of a flexible polyurethane foam prepared by reacting an organic polyisocyanate and a polyol in the presence of a blowing agent, a catalyst and a foam stabilizer, said method comprising substituting for from 5% by weight to 100% by weight of said polyol, a coupled polyol which consists essentially of the reaction product of an organic polyisocyanate and an organic compound having a hydroxyl functionality greater than 2, the isocyanate index used to produce said coupled polyol being from 10 up to the index at which gel occurs.

2. The process of claim 1 wherein said organic compound has a molecular weight of from about 500 to about 12000.

3. The process of claim 2, wherein said organic compound has a molecular weight of from about 1000 to about 8000.

4. The process of claim 3, wherein said organic compound has an average hydroxyl functionality of from 2.5 to 8.

5. The process of claim 3, when said organic compound has a molecular weight of from about 1500 to about 7000.

6. The process of claim 5, wherein said organic compound has an average hydroxyl functionality of from 2.5 to 4.

7. The process of claim 1, wherein said organic compound is a polyether.

* * * * *